United States Patent

[11] 3,620,636

| | | | |
|---|---|---|---|
| [72] | Inventor | Pierre Louis Simon Godard<br>Verneuil, France | |
| [21] | Appl. No. | 6,763 | |
| [22] | Filed | Jan. 29, 1970 | |
| [45] | Patented | Nov. 16, 1971 | |
| [73] | Assignee | Chrysler France<br>Paris, France | |
| [32] | Priority | Jan. 30, 1969 | |
| [33] | | France | |
| [31] | | 6901973 | |

[54] DRILLING DEVICE HAVING YIELDABLE MEANS FOR LIMITING THE THRUST PRESSURE TO A PREDETERMINED AMOUNT
7 Claims, 2 Drawing Figs.

[52] U.S. Cl. ..................................................... 408/141, 408/82
[51] Int. Cl. ........................................................ B23b 47/02
[50] Field of Search ........................................... 408/72, 82, 141

[56] References Cited
UNITED STATES PATENTS
3,334,366  8/1967  Schrolucke ................. 408/141

Primary Examiner—Francis S. Husar
Attorney—Steinberg & Blake

ABSTRACT: The invention has for its object a device for drilling sheet metal.
According to the invention, the pressure with which the drill is applied on the sheet is determined by a resilient member which is located between two drive members solid in rotation but not in translation and which are mounted in a sleeve which, during operation, rotates and slides in a fixed body of the device.

INVENTOR
PIERRE, LOUIS, SIMON GODARD
BY Steinberg & Blake
attys

DRILLING DEVICE HAVING YIELDABLE MEANS FOR LIMITING THE THRUST PRESSURE TO A PREDETERMINED AMOUNT

The present invention has for its object a drilling method and device, for drilling more particularly sheet metal.

The drilling of sheet metal of small thickness always presents great difficulties, on account of the deformations resulting from the pressure exerted by the drill on the wall and which cannot be controlled accurately, especially during a manual drilling operation.

Now, in most cases, there appears around the drilled hole a dish which makes it difficult to mount fastening means, in particular fastening clamps for lining or upholstery rods. This results in a nonuniform fastening of the members on the metal sheet and an unpleasant appearance of the whole assembly.

In order to meet such difficulties, use is made, according to the invention, of a method wherein the drilling pressure applied to the drill is obtained by the action of a resilient member, the amount of pressure of which is predetermined according to the characteristics of the workpiece to be drilled.

In the case of metal sheet, the pressure exerted by the spring on the drill is determined more particularly in accordance with the thickness thereof.

Such a method enables to avoid any deformation of the metal sheet subsequent to drilling and to obtain drilled holes allowing to readily mount the fastening members.

According to the present invention, use is made of a device for carrying out a drilling method, for drilling more particularly sheet metal, characterized in that the drilling pressure applied to the drill is obtained by the action of a resilient member, the amount of pressure of which is predetermined according to the characteristics of the workpiece to be drilled.

The invention will be better understood and other objects, characteristics and advantages thereof will appear as the following description proceeds, with reference to the appended drawing given solely by way of example illustrating one form of embodiment of the invention and wherein.

Figure 1:
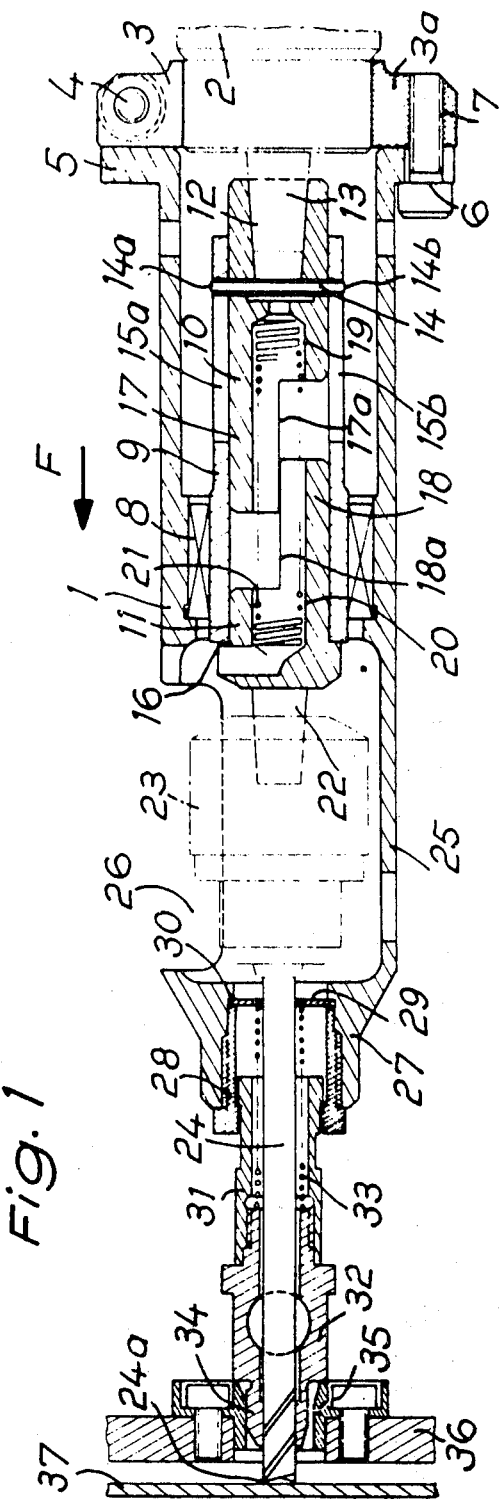
FIG. 1 is a longitudinal sectional view illustrating one form of embodiment of a drilling device according to the invention.

In FIG. 1 there is illustrated one form of embodiment of a drilling device according to the invention, comprising a hollow body 1 on which is mounted, at one of its ends, a drilling head 2 by means of two half rings 3, 3a between which is gripped the said drilling head by means of screws 4, and which are secured to a flange 5 of body 1 by means of screws 6 engaged in tapped holes 7 provided in the said rings.

Figure 2:
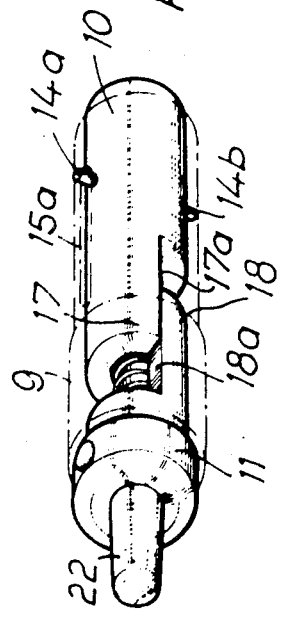
FIG. 2 is a perspective view of the two drive members mounted in the sleeve thereof.

In the medial portion of body 1 (FIGS. 1 and 2) is placed a bearing 8, for instance a needle bearing, in which is slidingly mounted a sleeve 9 adapted to receive internally two drive members 10, 11 slidingly mounted within the sleeve 9.

The drive member 10 is provided at one end with a taper hole 12 in which is engaged the head of a rotary pin 13 of the drilling head 2 which extends within the body 1.

On the drive member 10 is secured a pin 14, the ends 14a, 14b of which are engaged respectively in parallel longitudinal apertures 15a, 15b of the sleeve 9 so as to render solid in rotation the pin 13, the drive member 10 and the sleeve 9.

The drive member 10 (FIG. 2) is provided at its other end with a semicylindrical portion 17, a flat surface 17a of which is in contact with a corresponding flat surface 18a of a semicylindrical portion 18 of the drive member 11, so that the drive members 10 and 11 can slide relative to one another in the sleeve 9 by means of their semicylindrical portions 17, 18, the flat surfaces 17a, 18a of which slide on one another and ensure simultaneously the rotation of the drive member 11 by the drive member 10.

The drive member 11 is provided with a shoulder 16 by which it bears upon the end of the sleeve 9.

The drive members 10 and 11 provide respectively axial cylindrical housings 19, 20 in which is placed a resilient member 21 bearing at both ends on the bottom of the housings 19 and 20.

At its end opposite to the semicylindrical portion 18, the drive member 11 is provided with a taper pin 22 which is engaged in a gripping chuck 23 for the drill 24 which, in this case, is used to drill metal sheets as shown in FIG. 1.

The chuck 23 is placed in a cavity or counterbore 25 of the body 1 provided with a side opening 26 for placing the chuck 23 and tightening the drill 24.

On the end 27 of the body 1 is screwed a ring 28 with an interposed washer 29 abutting against a shoulder 30 of the body 1. In the ring 28 is located one end of a slide 31 carrying at its other end a centering bushing 32 of the drill 24, the said slide being subjected to the action of a spring 33 bearing on one side of the slide 31 or the bushing 32 and on the other side on the washer 29.

In the form of embodiment of FIG. 1, the end 34 of the bushing 32 is engaged in a guide bushing 35 secured to a drill jig or plate.

The drilling device according to the invention operates as follows.

The bushing 32 being engaged in the bushing 35 and the drill 24 driven in rotation by the pin 13 by means of the drive members 10, 11 and the chuck 23, the drilling head 2 and the body 1 are displaced in the direction of the arrow F so as to compress initially the spring 33 and bring the end 24a of the drill 24 into contact with the wall of a metal sheet 37.

When the end 24a of the drill comes into contact with the metal sheet 37, the drill and the drive member 11 do not move any longer in the direction of the arrow F, and nor does the sleeve 9 abutting against the shoulder 16 of the drive member 11. However, as the operator keeps on pressing the drilling head in the direction of the arrow F, the body 1 continues to move in this direction, and this produces a sliding of the bearing plate on the sleeve 9, the drive still being ensured between the sleeve and the drive member 10 by the pin 14 and between the drive members 10, 11 by the surfaces 17a, 18a thereof.

There thus occurs a sliding of the drive members 10 and 11 with respect to one another, so that the spring 21 is compressed so as to produce by reaction a predetermined pressure tending to thrust the drive member 11 and to apply the end 24a of the drill 24 on the metal sheet 37 with a pressure corresponding to that of the spring 21.

The pressure with which the end of the drill 24 is applied on the metal sheet 37 is therefore independent of the effort exerted by the operator to thrust the body 1 and the drilling head 2.

In order to modify the drilling pressure, it is sufficient to use different springs which are calibrated according to the characteristics of the metal sheet.

While the form of embodiment illustrated relates to a manual drilling device, it may be used on automatic machines provided with multiple drilling heads.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

I claim:

1. A drilling device for drilling sheets, boards and the like, comprising a rotatively driven drilling head, a first drive member, means to lock in rotation said first drive member on said drilling head, a sleeve rotatively mounted in a hollow body fixed to the device casing, a second drive member locked on a gripping chuck for the drill, at least one of said drive members being slidingly mounted in axial translation within said sleeve, said drive members presenting flat bearing surfaces extending axially, contacting one another and sliding one on the other causing said two drive members to be solid in rotation but not in translation within said sleeve said drive members having internal housings facing one another, a resilient member being mounted in said housings and bearing on their bottoms tending to push away said two drive members mounted in a relatively sliding relationship in said sleeve.

2. A drilling device according to claim 1, wherein said sleeve is slidingly received in said hollow body and said second drive member has a shoulder which bears on the adjacent end of said sleeve.

3. A drilling device according to claim 2, wherein said first drive member is slidingly mounted in said sleeve.

4. A drilling device according to claim 3, wherein a driving pin is engaged with said first drive member and its ends are slidingly received in two parallel axial slots provided in said sleeve.

5. A drilling device according to claim 1, wherein each of said drive members has a substantially cylindrical shape and ends in the form of a half cylinder cut by an axial plane forming at this end said flat bearing surfaces.

6. A drilling device according to claim 1, wherein said body comprises a cavity in which is placed the drill-gripping chuck and which is provided with a side opening.

7. A drilling device according to claim 1, comprising drill-guiding means constituted by a ring secured to the end of the body and in which is located one end of a slide carrying at its other end a centering bushing for the drill, the said slide being subjected to the action of a resilient member bearing on one side upon a washer placed at the bottom of the ring and one the other side upon the slider.

* * * * *